March 18, 1930.  H. G. FAIN  1,750,710
DOUGH MIXER AND BREAKER
Filed Jan. 23, 1928  2 Sheets-Sheet 1
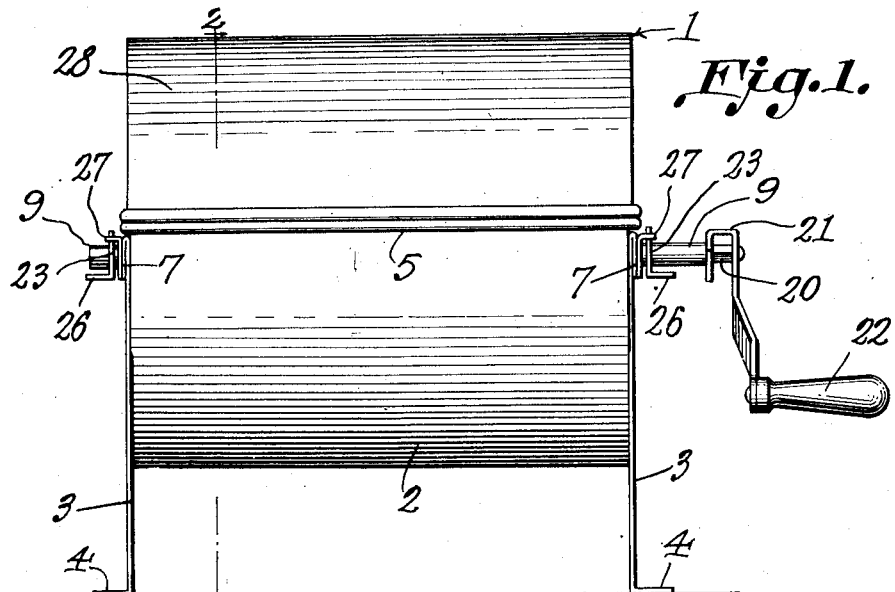
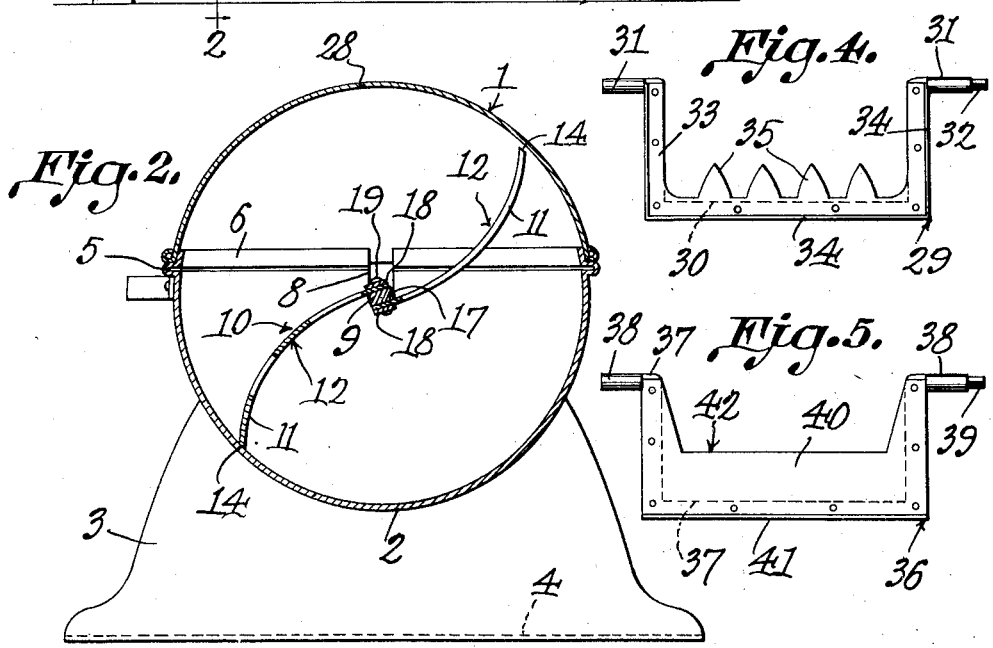
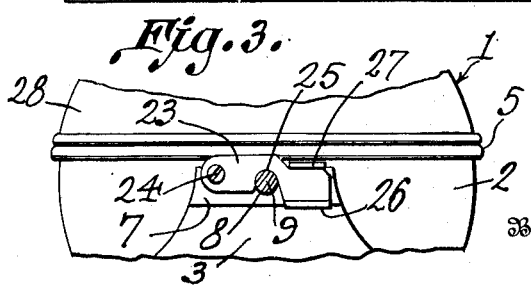
H. G. Fain, Inventor
By C. A. Snow & Co., Attorneys March 18, 1930.  H. G. FAIN  1,750,710
DOUGH MIXER AND BREAKER
Filed Jan. 23, 1928  2 Sheets-Sheet 2
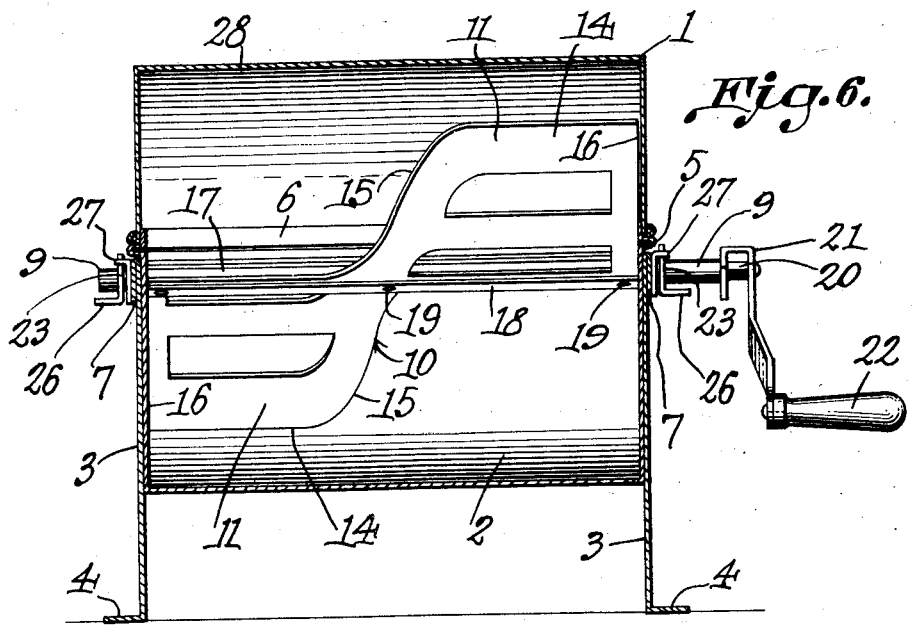
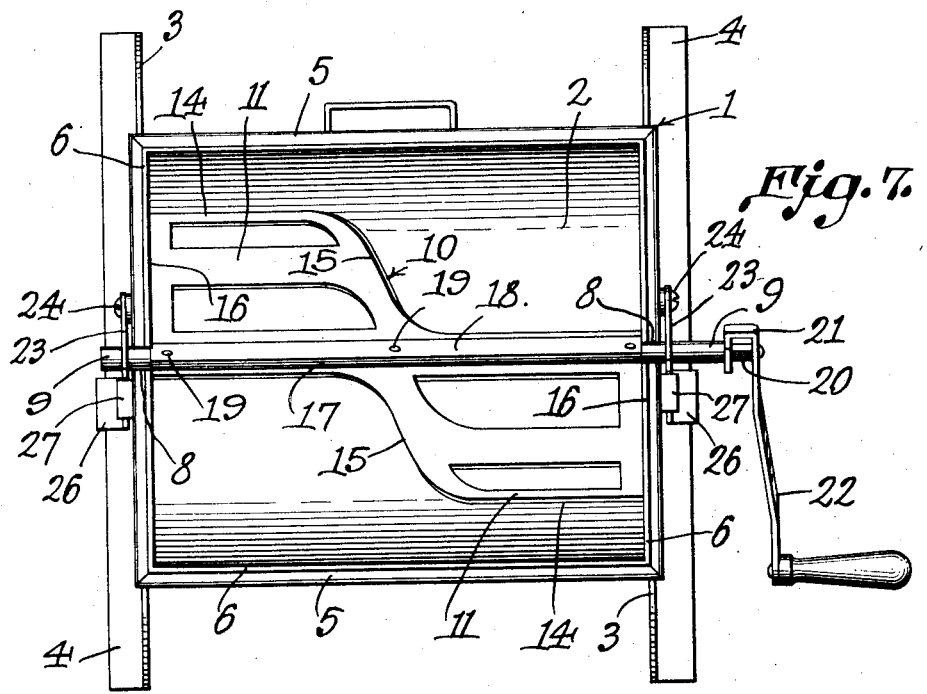
H. G. Fain
Inventor
By C A Snow & Co.
Attorneys Patented Mar. 18, 1930

1,750,710

UNITED STATES PATENT OFFICE

HENRY GANS FAIN, OF LITTLE ROCK, ARKANSAS

DOUGH MIXER AND BREAKER

Application filed January 23, 1928. Serial No. 248,881.

This invention aims to provide a simple and inexpensive means whereby a batch of dough may be mixed and broken, it being unnecessary to touch the ingredients with the human hand, until the bread dough is ready to go into the pan. The invention aims, especially, to provide novel means for supporting the shaft of the rotor for turning movement and to provide novel means for retaining the shaft in place.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the drawings:—

Figure 1 shows in elevation, a device constructed in accordance with the invention;

Figure 2 is a cross section on the line 2—2 of Figure 1;

Figure 3 is a fragmental end elevation wherein parts are broken away;

Figure 4 is an elevation showing a rotor different from the one depicted in Figure 2;

Figure 5 is an elevation showing another rotor;

Figure 6 is a vertical longitudinal section of the complete machine;

Figure 7 is a top plan with the cover off.

The device forming the subject matter of this application preferably is made of metal throughout and includes a receptacle that is marked generally by the numeral 1, the receptacle including a trough-shaped body 2. Plate-like supporting standards 3 are secured to the ends of the body 2 and are supplied with outstanding feet 4. The constituent material of the body 1 is distorted to form a supporting bead 5 located near to the upper edge of the body 2, and the extreme upper portion of the body 2 forms an upstanding rim 6 located above the bead 5. The upper ends of the standards 3 are turned down into contact with the main parts of the standards, to form reinforcing flanges 7. Bearing notches 8 are formed in the ends of the body 1, and these notches extend downwardly into the upper ends of the standards 3 and into the flanges 7. This construction gives a very good bearing for the shaft 9 that carries the rotor 10. The rotor 10 may include wings 11 that extend in opposite directions from the shaft 9, as delineated in Figure 2, the wings being concaved transversely, as shown at 12. One wing 11 is located near to one end of the body 2, and the other wing 11 is located near to the opposite end of the body, as shown in Figure 7. The outer longitudinal edges 14 of the wings 11 are straight and move in very close relation to the inner surface of the receptacle 1, the edges 14 merging into the reversely curved inner end edges 15 of the wings 11. The outer end edges 16 of the wings 11 are straight and move in proximity to the ends of the body 2. The intermediate portion 17 of the shaft 9 may be rectangular in cross section, and on the part 17 of the shaft, the oppositely extending wings 11 of the rotor 10 are held by battens 18 and securing elements 19. One end of the shaft 9 is squared, as at 20, to retain the U-shaped end 21 of a crank or handle 22, although any other suitable means may be used for rotating the shaft.

A means is provided for holding the shaft 9 for rotation in the bearing notches 8. With this end in view, latches 23 are held by pivot elements 24, for swinging movement, on the reinforcing flanges 7, the latches 23 being provided in their lower edges, and at points intermediate their ends, with seats 25 complemental to the bearing notches 8 and receiving the shaft 9. The latch 23 is provided on its lower edge and at its free end with a finger piece 26 by which the latch can be conveniently manipulated. The latch 23 is engaged along its upper edge, at its free end, beneath the horizontal lip of an L-shaped keeper 27 secured to the flange 7. Owing to the provision of the parts 7—8—23—24—25—26—27 shown in Figure 3, and hereinbefore described, a secure mounting for the shaft 9 is provided.

The receptacle 1 includes an inverted trough-shaped cover 28, supported on the bead 5 of the body 2, the rim 6 of the body extending upwardly within the lower edge of the cover 28.

The device includes a rotor 29 shown in Figure 4. The shaft of this rotor comprises a U-shaped intermediate portion 30 having cylindrical ends 31, one of which may be squared as at 32, to receive the crank 22 of an equivalent structure. To the intermediate portion 30 of the shaft is secured a correspondingly shaped plate 33 having a projecting flange 34 around its edge. The plate 33 has transversely spaced teeth 35 in its intermediate portion, the teeth 35 projecting toward the axis of rotation of the shaft.

In Figure 5 there is shown a rotor 36 including a shaft which has a U-shaped intermediate portion 37 and cylindrical ends 38, one of the ends 38 being squared as at 39 to receive the crank or other operating member. A plate 40 is secured to the intermediate portion 37 of the rotor shaft and has along its longitudinal edge, an outstanding flange 41. In the inner edge of the plate 40 is a notch or recess 42 which is about one-half as deep as the intermediate part 37 of the rotor shaft.

The dough is mixed through the instrumentality of the rotor 10 and then is broken up by the rotor 29 of Figure 4. The rotor 36 of Figure 5 is used.

The member 10, shown in place in Figures 2, 6, and 7, is a dough mixer. The member 29 of Figure 4 is a dough breaker. All edges of the member 29 fit close to the walls of the dough receptacle, and as the dough breaker passes under the dough, a turn will be given to the dough without tearing the outside of the dough. The member 36, shown in Figure 5, is a scraper. All edges of this device fit close to the walls of the dough receptacle, so that, after the dough has been properly mixed, the scraper 36 can be inserted to cut the dough from all of the walls of the dough receptacle.

What is claimed is:—

In a device of the class described, a receptacle including a body, plate-like standards secured to the ends of the body, the upper ends of the standards being formed into depending reinforcing flanges, the ends of the body, the standards, and the flanges, being supplied with bearing notches, a rotor movable in the body, a shaft carrying the rotor and journaled in the bearing notches, keepers mounted on the reinforcing flanges, pivot elements carried by the said flanges, and latches cooperating with the shaft to hold it for rotation in the bearing notches, the latches being detachably engaged with the keepers, and being mounted to swing on the pivot elements.

In testimony that I claim the foregoing as my own, I have hereto affixed my signature.

HENRY GANS FAIN.